No. 672,495. Patented Apr. 23, 1901.
C. W. SMITH.
BICYCLE PACKAGE CARRIER.
(Application filed Aug. 24, 1899.)
(No Model.) 2 Sheets—Sheet 2.
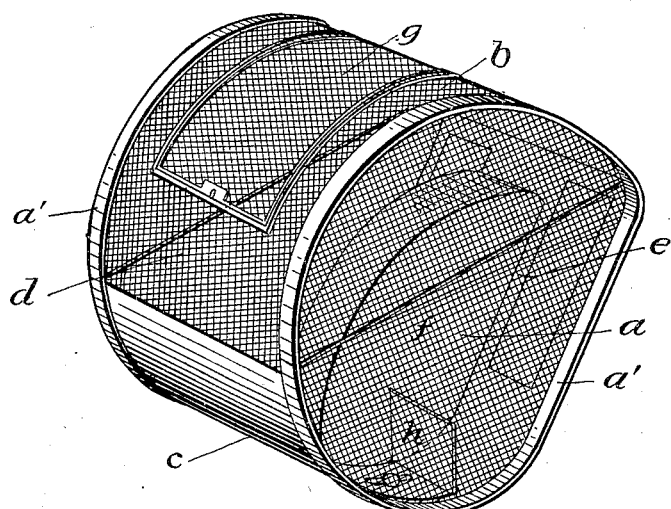
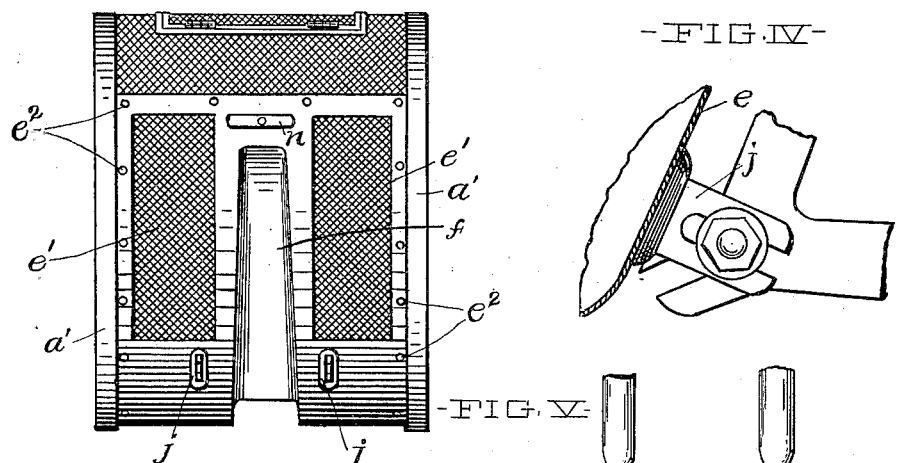
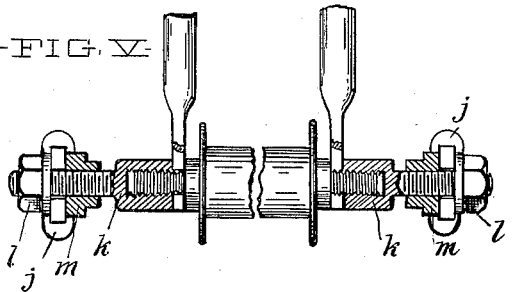
Witnesses
J. C. Turner
N. E. Merkel
Inventor
Chas. W. Smith
By J. B. Fay Atty

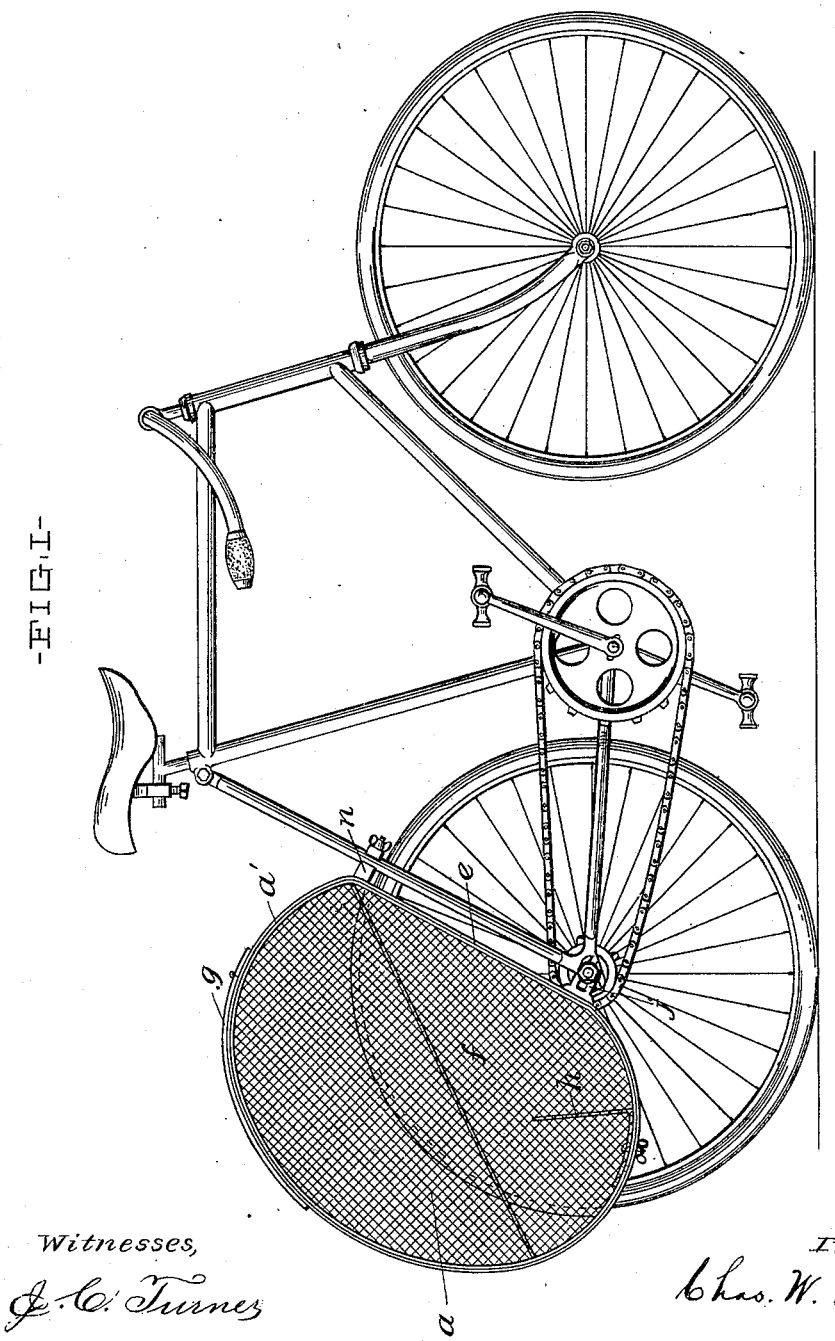

UNITED STATES PATENT OFFICE.

CHARLES W. SMITH, OF CLEVELAND, OHIO.

BICYCLE PACKAGE-CARRIER.

SPECIFICATION forming part of Letters Patent No. 672,495, dated April 23, 1901.

Application filed August 24, 1899. Serial No. 728,309. (No model.)

*To all whom it may concern:*

Be it known that I, CHARLES W. SMITH, a citizen of the United States, and a resident of Cleveland, county of Cuyahoga, and State of Ohio, have invented a new and useful Improvement in Bicycle Package-Carriers, of which the following is a specification, the principle of the invention being herein explained and the best mode in which I have contemplated applying that principle, so as to distinguish it from other inventions.

My invention relates to improvements in devices for carrying packages on bicycles, the object being to produce a carrier of greatest possible strength and rigidity, least possible weight, noiseless, of economical construction, and offering the least amount of atmospheric resistance.

The invention consists of means hereinafter fully described.

The annexed drawings and the following description set forth in detail certain mechanism embodying the invention, such disclosed means constituting but one of various mechanical forms in which the principle of the invention may be used.

In said annexed drawings, Figure I represents a side elevation of a bicycle with my improved package-carrier attached thereto. Fig. II represents a perspective view of said carrier detached from the bicycle. Fig. III represents a front view of the detached carrier. Figs. IV and V represent enlarged detail views of the end of the rear bicycle-fork, showing also that portion of the carrier attached thereto; and Fig. VI represents the carrier detached and covered by a waterproof hood or cover, a portion of the latter being broken away to disclose the carrier beneath.

My improved carrier consists of two parallel lateral sides $a$, constructed of open wire or similar net work joined by a top portion $b$, bottom portion $c$, and rear portion $d$, formed upon a continuous curve, preferably similar to that of a letter "a," as shown in Fig. I, and a front inclined portion $e$, parallel or substantially parallel with the rear bicycle-fork. A hood or shield $f$ is formed and projects within said carrier to receive the rear bicycle-wheel and extends from the bottom of the receptacle to within a short distance of the top of the front portion $e$. The top and rear portions are also constructed of open wire or other net work, the top being provided with a suitable door $g$, which may be provided with a lock.

The lateral sides $a$ are each provided with a circumferential flange $a'$, which projects outwardly from its respective side and prevents the latter from injury by contact.

The front portion $e$ is provided with two apertures $e'$ $e'$, each covered with wire or net work similar to that covering the top and rear portions of the carrier, and is further provided with glove-clasp fasteners $e^2$, to which a waterproof hood or cover O may be secured, as shown in Fig. VI, similar fasteners being secured at the bottom and rear portion to secure the said hood at other points, as is necessary to properly secure same.

Traversing the inside of the receptacle in a transverse direction and secured to the bottom thereof is a removable adjustable upright wall or stop $h$, extending one in each side of the hood, as shown in Fig. II.

To the lower part of the front wall of the receptacle are secured two forks $j$, which are located one on each side of the hood or shield $f$. The rear axle of the bicycle is provided, one on each side, with two lateral extensions $k$, Fig. V, each such extension being threaded to receive two nuts $l$ and $m$, between which each of said forks $j$ is placed and secured. It is seen that by manipulating these nuts and adjusting the forks $j$ the carrier may be adjusted laterally and the rear wheel hence adjusted laterally in the hood. To the upper part of said front wall is secured a clamp $n$, provided with rubber contact-pieces, by means of which the carrier may be secured at this point to the upper portion of the rear fork, as shown.

Owing to the fact that the carrier is formed with a substantially flat front portion which is parallel with the rear fork and that the bottom and top join or run into the front portion without the formation of angles, the rear being a curved connection of the top and bottom, no angular recesses of any kind are formed therein in the line of movement of the wheel. This construction allows the principal weight to be carried close to the rear axle and be automatically held in such position regardless of the jolting action due to the wheel's motion. Any such movement tending to move the weight rearwardly would be negatived by the shape and configuration of the bottom and its curved connection with the front and rear portions, and should there be under extraordinary circumstances a movement of this character the return movement would be without noise, &c., so that the particular shape, configuration, and construction shown each has its share in making the carrier light in weight, durable, and, above all, noiseless. The open and curved construction causes the device to offer the least amount of atmospheric resistance compatible with rigidity and strength.

The stop-walls $h$ make it possible to arrange the heavier packages to be carried nearer the center of support of the carrier, and hence cause the center of gravity of the loaded carrier to fall nearer the rear axle, whereby the stability of the combination is increased to the greatest possible extent.

Other modes of applying the principle of my invention may be employed instead of the one explained, change being made as regards the mechanism herein disclosed, provided the means covered by any one of the following claims be employed.

I therefore particularly point out and distinctly claim as my invention—

1. The herein-described bicycle package-carrier, consisting of the receptacle having the two parallel flat sides $a$ joined by the curved top portion $b$, curved bottom portion $c$ curved rear portion $d$ forming one continuous curved surface, and the front portion $e$, the circumferential outwardly-projecting flange $a'$, the inwardly-projecting head or shield $f$ adapted to receive a portion of a bicycle-wheel, and means for removably and rigidly securing such receptacle to the rear of a bicycle.

2. A bicycle package-carrier, composed of two flat upright sides, a substantially flat front portion and a top, bottom and rear portion formed upon a continuous curve, running into said front portion, said front portion provided with a central opening and a shield for receiving a bicycle-wheel located in said opening, and extending into the receptacle, and two upright adjustable walls each extending between said shield and the contiguous upright side of said receptacle, and means for securing the carrier to the rear of a bicycle, substantially as set forth.

3. A bicycle-carrier consisting of the upright sides $a$, the top, bottom and rear portions formed upon a continuous curve, the inclined front portion $e$, and provided with the centrally-located shield $f$ and the transverse walls $h$, the sides $a$ being provided with the laterally-extending and circumferential flanges $a'$, substantially as set forth.

Signed by me this 22d day of August, 1899.
CHARLES W. SMITH.

Attest:
JAMES W. MOORE,
A. E. MERKEL.